(No Model.)
H. W. EAMES.
BAIL FASTENING OR CLUTCH.
No. 338,342. Patented Mar. 23, 1886.
FIG. I
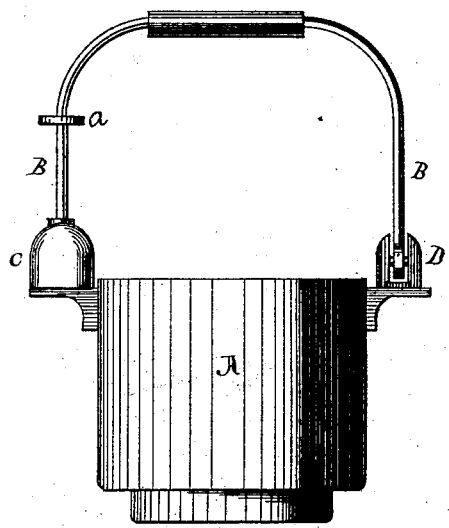
FIG. II
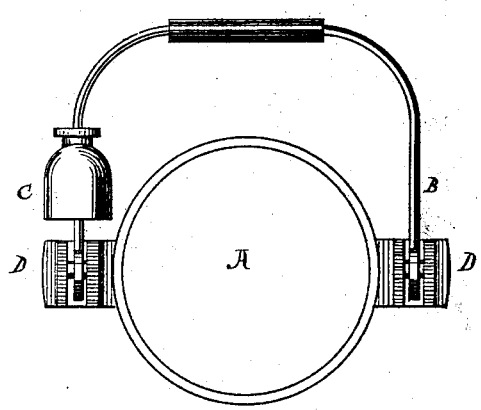
FIG. III
Attest:
Samuel Cohn
George B. Ballou
Inventor:
Hiram W. Eames

UNITED STATES PATENT OFFICE.

HIRAM W. EAMES, OF MILFORD, MASSACHUSETTS.

BAIL FASTENING OR CLUTCH.

SPECIFICATION forming part of Letters Patent No. 338,342, dated March 23, 1886.

Application filed September 18, 1884. Serial No. 143,441. (No model.)

*To all whom it may concern:*

Be it known that I, HIRAM W. EAMES, of Milford, in the county of Worcester and State of Massachusetts, a citizen of the United States, have invented a new and useful Improvement in Bail-Fastenings for Hollow Ware, &c., of which the following is a full, clear, and exact description, reference being had to the accompanying drawings, forming a part of this specification, in explaining its nature.

The object of the invention is to provide a cheap and simple device for locking a swinging bail to the pot, kettle, or other utensil to which it is attached when the bail is moved to a vertical position, which locking device is adapted to work automatically.

It is quite desirable for the proper and safe handling of pots, kettles, &c., to lock the swinging bail stiffly or rigidly to the kettle or other utensil when it is moved or its contents emptied, as by so doing there is less liability of accident from escaping steam or hot liquid or material, and the pot or kettle can be much more easily handled.

Referring to the drawings, Figure I represents in side elevation a kettle containing my invention, the bail being represented as in a perpendicular or vertical position and locked at one side to an ear projecting from the kettle. Fig. II represents the kettle in plan view, the bail being in a horizontal position, and of course unlocking it from the ear. Fig. III is a view in elevation of the locking device.

Referring to the drawings, A represents the kettle, and B the swinging bail, which has at each end an eye for the reception of the rivets or pivots which secure them to the ears D. Arranged upon the bail is the movable sleeve C, which is adapted to slide upon the bail and cover one of the ears D when the bail is moved to a perpendicular or vertical position. This sleeve of course is shaped upon its interior to entirely cover the ear D. Of course any shaped ear may be employed so long as the sleeve is shaped to cover it and lock the bail to it.

It will be observed that upon moving the handle to a vertical position the locking-sleeve C automatically drops over the ear and locks the bail securely to the ear. In other words, the locking device does not need to be moved by hand into a locking position.

To prevent the locking-sleeve C from moving upon the bail to such a position that it will not automatically operate, I have arranged upon the sleeve the stop *a*, against which the upper end of the sleeve comes in contact when the bail is dropped to a horizontal or inclined position. Of course I may use one locking-sleeve, as represented in Figs. 1 and 2, or two, as may be desired. One, however, is sufficient for all ordinary purposes.

I do not wish to be understood as confining this invention to its use in connection with a kettle such as is shown in the drawings, but may use it in connection with any pot or article of hollow ware or utensil of a similar character having a swinging bail.

I am aware of the patent to T. H. Dodge, No. 9,744, dated May 24, 1853, which shows a bail provided with a dovetail bolt adapted to be moved by hand into a dovetail recess in the ear of the kettle; but I consider that the same does not embrace the essential features of my invention.

It is of course obvious that any ring or sleeve adapted to fit and slide upon the bail, so that it automatically covers or surrounds the bail-ear, may be used in lieu of the sleeve herein described. It will also be observed that by making the sleeve or locking device so that it surrounds the bail, and by making the bail-connection with the ear central, the sleeve is at all times accurately guided by the bail to the ear, and that it does not require to bear a certain relation to the bail in order to lock it to the ear. Of course the ear must be of such configuration as to readily receive the locking-sleeve, and for that reason it is desirable that it taper upward a little, or be reduced in size at its top, so as to form inclined surfaces, upon which the sleeve may ride down and be guided as it drops into locking position.

Having thus fully described my invention, I claim and desire to secure by Letters Patent of the United States—

1. The combination, in a kettle or other utensil having ears and a swinging bail attached thereto, of a tubular locking device having a hole of a size to receive the bail, and another hole or opening of a size to embrace or surround one of the ears when the bail is in a vertical position, and adapted to then automatically lock the bail thereto, all substantially as and for the purposes described.

2. The combination of a pot or kettle having ears, a swinging bail attached thereto having a stop, $a$, and the sliding sleeve C, all substantially as and for the purposes described.

HIRAM W. EAMES.

Witnesses:
 GEORGE B. BALLOU,
 LEWIS HAYDEN.